United States Patent
DeMesa et al.

(10) Patent No.: US 6,700,590 B1
(45) Date of Patent: Mar. 2, 2004

(54) SYSTEM AND METHOD FOR RETRIEVING AND PRESENTING DATA USING CLASS-BASED COMPONENT AND VIEW MODEL

(75) Inventors: Jesse G. DeMesa, Lake Forest, CA (US); David C. Johnson, Aliso Viejo, CA (US)

(73) Assignee: Indx Software Corporation, Aliso Viejo, CA (US)

(*) Notice: Subject to any disclaimer, the term of this patent is extended or adjusted under 35 U.S.C. 154(b) by 294 days.

(21) Appl. No.: 09/704,471

(22) Filed: Nov. 1, 2000

Related U.S. Application Data
(60) Provisional application No. 60/162,975, filed on Nov. 1, 1999.

(51) Int. Cl.[7] .................................................. G09G 5/00
(52) U.S. Cl. .................................... 345/744; 709/224
(58) Field of Search ........................... 345/619, 745, 345/744, 440; 709/224

(56) References Cited

U.S. PATENT DOCUMENTS

| | | | | |
|---|---|---|---|---|
| 5,412,774 A | * | 5/1995 | Agrawal et al. | 345/804 |
| 5,414,809 A | * | 5/1995 | Hogan et al. | 345/765 |
| 5,760,770 A | * | 6/1998 | Bliss et al. | 345/745 |
| 5,917,498 A | * | 6/1999 | Korenshtein | 345/619 |
| 5,958,012 A | * | 9/1999 | Battat et al. | 709/224 |
| 6,002,853 A | * | 12/1999 | de Hond | 709/219 |
| 6,014,138 A | * | 1/2000 | Cain et al. | 345/826 |
| 6,122,664 A | * | 9/2000 | Boukobza et al. | 709/224 |
| 6,178,362 B1 | * | 1/2001 | Woolard et al. | 700/295 |
| 6,246,410 B1 | * | 6/2001 | Bergeron et al. | 345/854 |
| 6,247,020 B1 | * | 6/2001 | Minard | 707/104.1 |
| 6,262,729 B1 | * | 7/2001 | Marcos et al. | 345/744 |
| 6,263,339 B1 | * | 7/2001 | Hirsch | 707/102 |
| 6,307,546 B1 | * | 10/2001 | Wickham et al. | 345/771 |
| 6,336,138 B1 | * | 1/2002 | Caswell et al. | 709/223 |
| 6,407,761 B1 | * | 6/2002 | Ching et al. | 345/835 |
| 6,505,246 B1 | | 1/2003 | Land et al. | |

OTHER PUBLICATIONS

User's Guide for version 1.1 of XHQ from Indx Software Corporation, 75 pages (see associated description in attached Information Disclosure Statement).

Press release titled "INDX Releases Version 1.1 of INDX HQ," dated Dec. 31, 1998, 2 pages (see associated description in attached Information Disclosure Statement).

*Intellution Dynamics Package* by Intellution Inc., Foxborough, MA. Described in p. 2 of patent specification. Date unknown.

*In Touch* by Wonderware Corp., Irvine, CA. Described in p. 2 of patent specification. Date unknown.

\* cited by examiner

*Primary Examiner*—Matthew C. Bella
*Assistant Examiner*—Po-Wei Chen
(74) *Attorney, Agent, or Firm*—Knobbe, Martens, Olson & Bear LLP

(57) ABSTRACT

A system and method for retrieving and presenting data using class-based component and view model is disclosed. The disclosed system retrieves data of various formats, including relational data, point data and time-series data, and connects such data to class-based components and component members. Using a class based, i.e., object oriented model, it provides means for developers and users to define and modify reusable components, and means for developers and users to define and modify reusable views to present data in graphics including animation.

68 Claims, 9 Drawing Sheets

SYSTEM AND METHOD FOR RETRIEVING AND PRESENTING DATA USING CLASS-BASED COMPONENT AND VIEW MODEL

CROSS REFERENCE TO RELATED APPLICATIONS

This non-provisional application claims priority date of the provisional patent application Ser. No. 60/162,975 for "System to Provide Real-Time Information Portal using Class-Based Component and View Model" filed Nov. 1, 1999.

BACKGROUND OF THE INVENTION

1. Field of the Invention

The present invention relates to collecting, modeling, and providing access to information.

2. Description of the Related Art

A number of attempts have been made to retrieve data from a business organization's various data sources (called back-end data sources) and to present that data to users. An organization's various back-end data sources may contain different types and formats of data, including relational data, point data, time-series data, and object data. Relational data comprise data from multiple tables of multiple fields. The tables may be related to each other through indexes. Point data is single-type data typically associated with manufacturing systems. For example, a data system may continuously collect a motor's operating speed and operating temperature as point data. Unlike relational data, point data typically are not comprised of multiple tables. Time-series data are data that store the change in data value over time. Object data are data represented by objects. The concepts of object, object-oriented design, object-oriented programming and object-oriented databases are known to those skilled in the art.

Data warehouse products and more custom database approaches typically collect data from back-end data sources and deposit the data into a new data warehouse (or data mart) for data analysis and presentation. Some data mining processes operate on data warehouses to provide detailed analysis such as marketing and sales trends, and to test hypothesis such as customer buying patterns. However, those analyses are usually only available to a few analysts and executives in an organization. In addition, a data warehouse usually stores historical data for long term analysis, but is not suitable for real time or near real time applications.

Application packages such as Intellution Dynamics Package by Intellution, Inc. of Foxborough, Mass. and InTouch by Wonderware Corporation of Irvine, Calif. provide for visualization of plant operational data in some manufacturing systems. These packages have very limited ability to retrieve and present relational data typically associated with other manufacturing systems and non-manufacturing systems such as enterprise resource planning (ERP) systems. Typically, the major limitations include an inability to monitor relational data as it changes over time, navigate the relational data for more detailed monitoring or status, and to find supporting details. Because they do not provide access to both point data and relational data, enterprises often have to use multiple systems to provide data visualization, navigation and analysis of various types and formats of data. Using multiple systems often results in high financial and computing expenses and programming and administrative complexity.

Some systems convert back-end data into relational data stored in a relational database for selection, analysis and visual presentation. Such a relational database typically needs to be managed by a database administrator, in order to handle the complexity of a relational database comprising multiple tables and indexes, especially when data has to be converted and acquired from different back-end systems. In addition, those systems cannot utilize the advantages of object data.

Some systems convert point data and relational data from back-end data sources into point data to present to users. Since the back-end data are converted into point data, those systems cannot utilize the advantages of object data and also lose any benefits associated with relational data.

Other systems convert back-end data into object data, but fail to provide access to the object data using a class-based representation model. What is needed is a system and method providing access to back-end data in object form, in real time, and using a class-based component and view model.

SUMMARY OF THE INVENTION

One aspect of the invention involves the use of a class-based component and view model to collect and display data from multiple sources. The class-based component and view model is preferably embodied within a system that uses reusable components and views to monitor the operation of a business entity, such as but not limited to a business entity that has manufacturing facilities or plants in various locations. The data that is collected and displayed by the system may, for example, include relational data, point data and/or time-series data. The system also preferably includes development tools for creating and deploying the reusable components and views to generate a model of a business entity, A class-based component and view model has several advantages. One advantage is reusability. For example, if a new process is added to all plants, the user or developer only needs to add a component member "the new process" to the existing component definition of "plant". The user or developer need not re-create the component definition of "plant". By selecting one menu command, the user or develop can then propagate the new process to all plants such as the Chicago Plant and the Milwaukee Plant, since all plants inherit the same common characteristics of the "plant" component. All existing definitions, connections and codes associated with the existing "plant" component can still be used. Another advantage is scalability. If a new Cleveland plant is added to existing plants, the user or developer only needs to create a new instance of the "plant" component, or create a new component "Cleveland plant" comprising the "plant" component as one member, and the Cleveland plant will automatically inherit all the common characteristics of the plant component, specified in the plant component definition.

Under the class-based component and view model, views are class based. A view is a graphical representation of a component. Since a component may comprise components as its members, a view can also represent a collection of components. For example, a view representing a plant can be used to represent plants in Chicago, Milwaukee and Cleveland, with the same display format but connected to different back-end data. Since class-based components and views are reusable and scalable, developers and users save time on programming and managing. Moreover, since views correspond to components, which can represent business elements, users who build views do not need to understand the intricate details of back-end data locations and formats. Thus, a class-based model advantageously allows users to manage tasks typically managed by professional information technology developers. For example, once the "plant" component is defined, the user can use the "plant" component definition to create a new Cleveland plant without knowing the underlying data structure of the plant component. A user simply adds a new view for the Cleveland plant by creating a new copy of the "plant" view connected to the Cleveland plant. The user does not need to know the underlying data structure of the view. If a component has a member that is another component, the developer or user may insert one view representing the component member into the view representing the parent component. This views-in-views feature is very valuable, because modifying a class-based view does not require modifying other views that use the modified view, and the modified view propagates to all views that use the modified view.

A class-based component and view model also ensures the consistency of data structures. For example, once a "plant" component is defined, the Chicago, Milwaukee and Cleveland plants all share the common characteristics of a plant component. The change to the component definition of a "plant" will be reflected in the Chicago, Milwaukee and Cleveland plant definitions. Such a class-based model also reduces complexity of use, and enables users who are not skilled information technology professionals to create and modify components and views on their own. Users can think of the data structure not in programming terms, but in business terms, as business classes, components, and members. Advantages of class-based, i.e. object oriented data representation and programming are known to those skilled in the art.

The claimed system preferably allows multiple views corresponding to the same components, and thus allows users or developers to build different views of varying levels of detail corresponding to the same component. This is advantageous because different people within a business organization may demand different views that connect to the same data. For example, a plant foreman may want views that show the operating temperature, speed and production numbers of machines. The plant supervisor may want views that show the production numbers of machines. The company executive may want views that show the production totals of each plant. Some prefer to have data displayed in tables while others prefer charts. The system also preferably includes functionality for creating views in which data changes are displayed as animations or animation effects.

DETAILED DESCRIPTION OF THE PREFERRED EMBODIMENT

Figure 1:
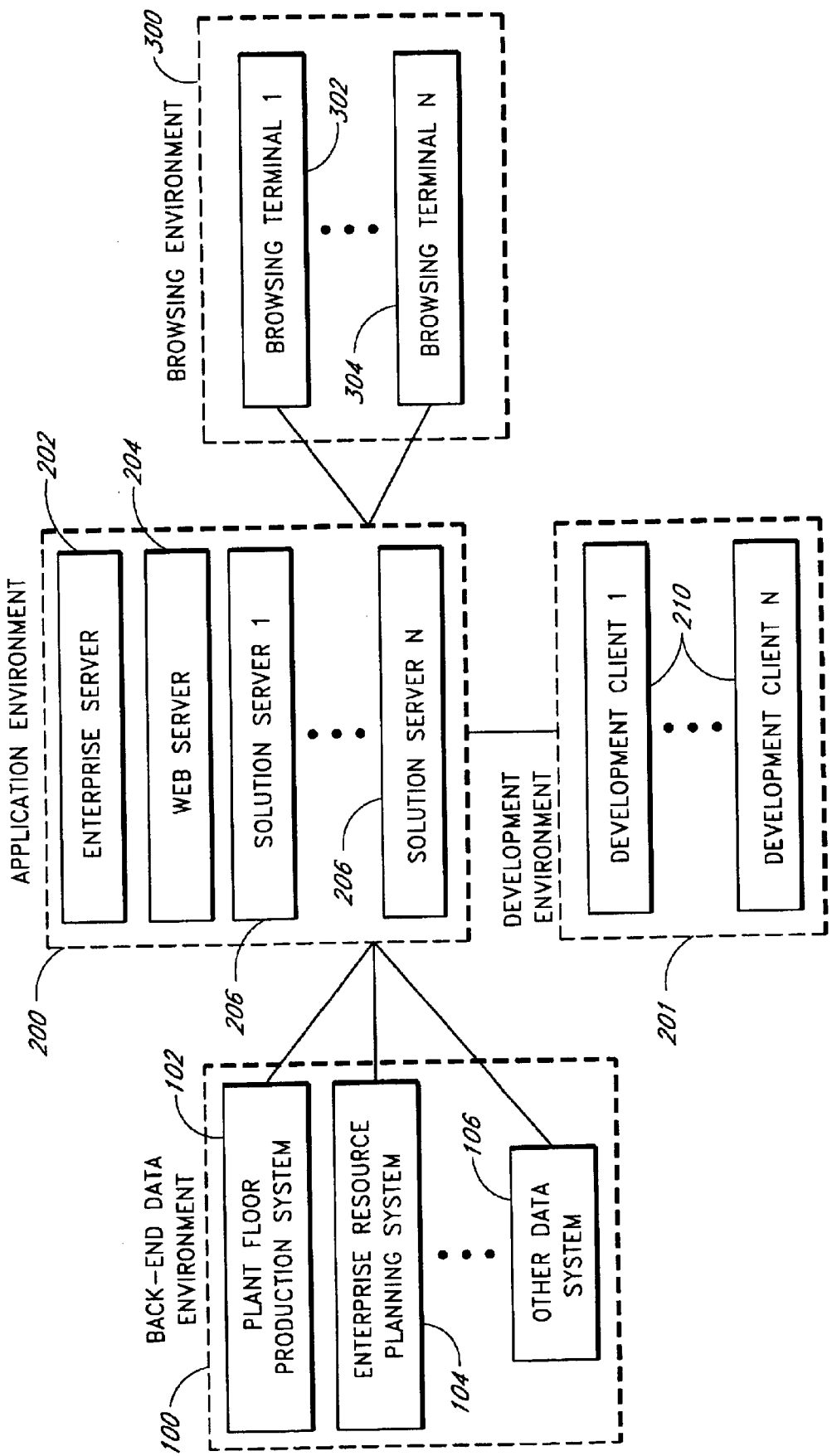
FIG. 1 illustrates components and environments that use one embodiment of the present invention.

FIG. 1 illustrates components and environments which use one embodiment of the present invention. A back-end data environment 100 comprises various data sources, such as plant floor production systems 102, enterprise resource planning data systems 104, and other data systems 106. Such data sources contain data of various formats, such as relational data, point data, time-series data, or object data or a combination of those. The various data sources from the back-end data environment 100 are connected to an application environment 200. As used herein, the term connected means directly or indirectly capable of communicating over a direct wired, network or wireless connection.

The application environment 200 comprises an enterprise server 202, a web server 204, and one or more solution servers 206. The application environment 200 is connected to a development environment 201. The development environment 201 comprises one or more development clients 210. In the preferred embodiment, the enterprise server, web server, solution servers and development clients comprise application programs in Java and/or C++ and running under Windows NT.

The application environment 200 is connected to a browsing environment 300. The browsing environment 300 comprises one or more browsing terminals 302. Each browsing terminal 302 comprises a communication program such as a web browser. In the preferred embodiment the browsing terminals 302 are connected to the application environment 200 through the Internet using web browsers such as Netscape Communicator or Internet Explorer launched from the browsing terminals 302. In another embodiment, the browsing terminals 302 are connected to the application environment 200 through an Intranet.

The claimed system provides options for a developer or user to specify the frequency at which data is to be fetched from the back-end environment 100 into the application environment 200. If data were fetched too frequently, it would be a waste on system resources and may adversely affect system performance. On the other hand, if the data were not fetched frequently enough, a user could end up viewing data that is unacceptably out-dated. By fine-tuning the fetching frequency, a developer or user can ensure that users view data that is sufficiently timely. The system and method for specifying the data fetch frequencies are known to those skilled in the art.

Figure 2:
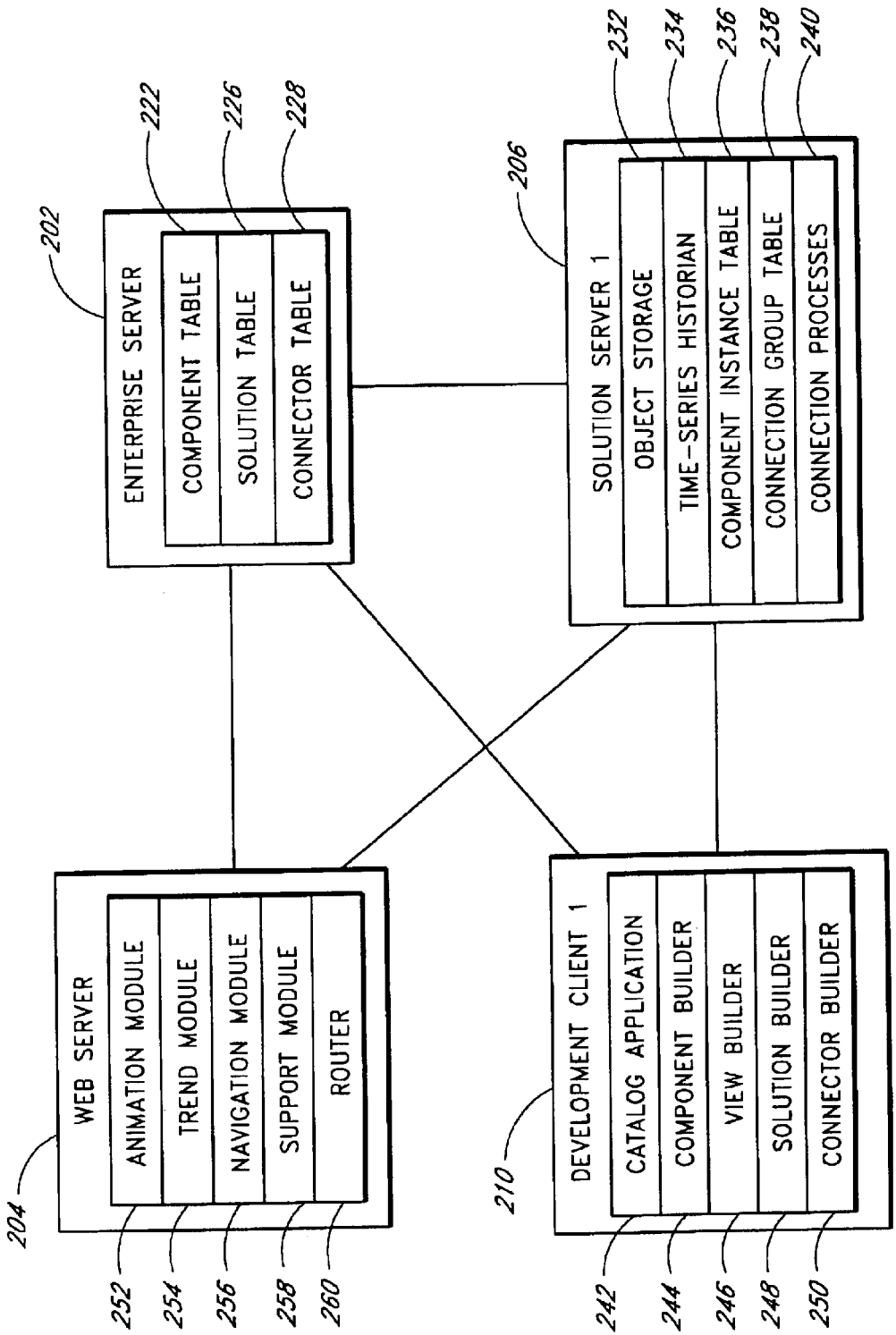
FIG. 2 illustrates a representation of modules of an application environment and a development environment in accordance with one embodiment of the present invention.

FIG. 2 illustrates a representation of modules of the application environment 200, and the development environment 201. While the preferred embodiment may comprise multiple solution servers and multiple development clients, only one solution server 206 and only one development client 210 are shown on FIG. 2 for ease of illustration.

The enterprise server 202 comprises a component table 222 that stores component definitions. A component is a reusable software resource that contains and represents the information associated with a data source, such as a business entity. Thus, for example, a component may represent a customer, a shipping route, or a credit check process. A component can represent a collection of values, for example, yesterday's customer orders from a back-end relational database. By using components to represent business elements, the claimed system facilitates user understanding in terms of the business process. A component is made up of one or more members. Each member can be a number, a date, a text string, a Boolean logical value, or another component. For example, a "customer" component may be comprised of members such as name, identification number and address. A run-time usage of a component is called a component instance. When a component is reused, a unique instance of that component is created, with a unique name. Different instances of the same component can follow different instructions on where, when, how and how often to retrieve back-end data.

For each component represented in the component table 222, the component table 222 also stores definitions of views associated with that component. By storing all component and view definitions on the enterprise server 202, the system ensures that all developers and users across the enterprise can utilize and inherit the same component and view definitions. The enterprise server 202 also comprises a solution table 226 that stores the names, descriptions and locations of solutions, and a connector table 228 that stores the name, description and configuration code of all connectors. The connection process configurations are stored in the solution servers 206 in the connection processes module. The connection processes that execute commands to acquire component instance data and global collection data from back-end data sources are located on the solution servers 206. A solution is a component instance with a defined connection to a back-end data. A connector comprises program code for connecting a component instance or a global collection to a back-end data source. A global collection represents multiple instances of the same class of data, such as "all orders", "all customers", or "all customers from the East Region" (located in the East Region database).

The web server 204 comprises an animation module 252 which displays views with animation effects and manages user interaction with the views, a trend module 254 which displays trends of component instance data change as data change over time, a navigation module 256 which manages the tree-structure navigation of views, and a support module 258 which supports data communication between the application environment 200 and the browsing environment 300. In one embodiment, the animation module 252, the trend module 254, the navigation module 256 and the support module 258 comprise one or more Java applets. The web server 204 also comprises a router 260 as the data communication gateway between the browsing terminals 302 and the application environment 200.

The solution server 206 comprises an object storage 232, a time-series historian 234, a component instance table 236, a connection group module 238 and a connection processes module 240. The object storage 232 receives data from the back-end data environment 100 and stores such data. The object storage 232 stores some objects in memory and commits other objects to disk to allow for storing large quantities of data. Those of ordinary skill will appreciate that objects may be stored entirely in memory or on disk or on other media, and the present invention is not limited by the type of media used to store objects.

Even if users want the same data, the data only needs to be retrieved from the back-end environment 100 once, and can then be transmitted from the object storage 232 to one or many users who request it. Since the data are stored directly in memory or disk, and not in a relational database, the data administration task is typically simpler than a relational database.

The time-series historian 234 is a database preferably optimized for storing time-centric data. The time series historian 234 stores time-stamped data values received from the back-end data environment 100. The time-series historian 234 can be an independent third-party product or custom-designed for the claimed system. It will be appreciated by those of ordinary skill that a flat file system or database may be used to implement the time-series historian 234 by storing for subsequent access data separated by a time interval, generated by the same source and storing an associated time stamp.

The component instance table 236 stores the connection configurations for each component instance within the solution held by that solution server 206. The connection configurations comprise a connection group to connect to the back-end data, or the program command to select a subset of a global collection, as described in connection with FIG. 7.

A connection group comprises a connection process and a connector. A connection process is the program command that starts the execution of the connector. The connection group module 238 stores connection groups.

The connection processes module 240 comprises a table storing connection processes and their respective locations. The connection processes module 240 uses connection processes to retrieve data from the back-end data environment 100, and sends the retrieved data to the object storage 232. If a user or developer selects, for example, in the solution builder 248, an option to store data in time-series historian, the connection processes module 240 sends the retrieved data to the time-series historian 234 for storing.

The development client 210 comprises a catalog application 242, a component builder 244, a view builder 246, a solution builder 248, and a connector builder 250. Components and views are created or modified within the development client 210 and sent to the enterprise server 202 to be stored in the component table 222. The catalog application 242 is an interface that includes and provides access to a list of components. Each component is represented by a component name and an icon. When a developer or user selects a component from the list for modification or starts to create a new component, the developer/user is directed from the catalog application 242 to the component builder 244. The component builder 244 allows a developer or user to create and edit components.

When a developer/user selects a component from the catalog application 242, the developer/user may select the menu option "create new view" to create a new view for that component, or may select the menu option "edit view" to edit a view for that component. The developer/user will then be directed from the catalog application 242 to the view builder 246. The view builder 246 allows a developer or user to create and edit views to attach to existing components.

The solution builder 248 allows a developer or user to create or modify a solution, and to specify how to connect the solution to back-end data sources. In one embodiment, the present invention supports Microsoft's Dynamic Data Exchange (DDE) protocol and Microsoft's Open Database Connectivity (ODBC) application programming interface for connecting to back-end data sources.

The connector builder 250 allows a developer or user to add, modify or delete a connector. A connector is the program code that connects to back-end data. The created or modified connector definitions are transmitted from the connector builder 250 to the enterprise server 202 and stored in the connector table 228. Each connector has an associated connector type such as ODBC, DDE, Oracle or MS-SQL.

Figure 3:
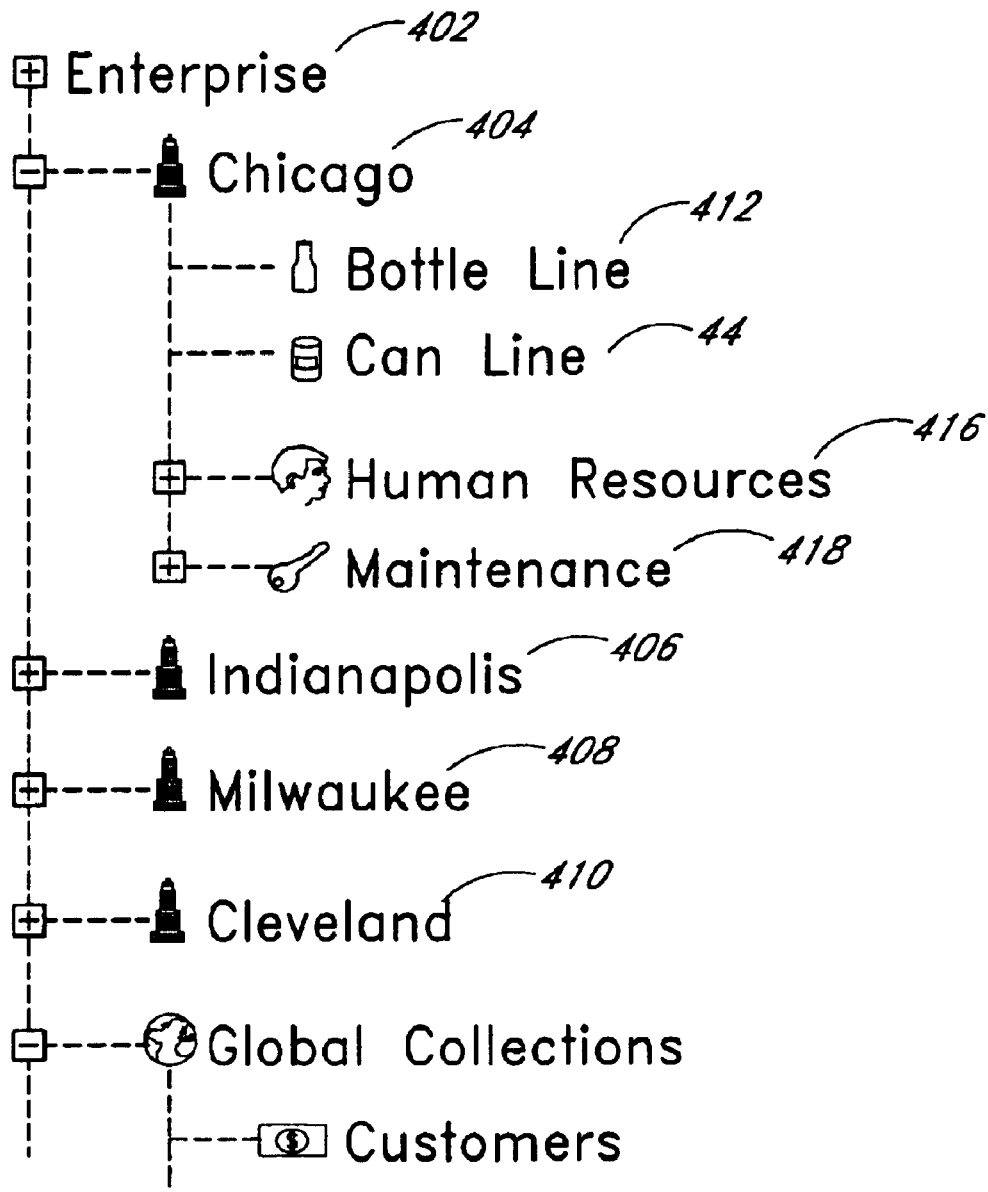
FIG. 3 illustrates the tree-style solution display and navigation structure of the preferred embodiment.

FIG. 3 illustrates a tree style navigation and display structure representing solutions. As FIG. 3 illustrates, the top node solution "enterprise" 402 comprises several member solutions representing plants in Chicago, Indianapolis, and Milwaukee. The Chicago plant 404, the Indianapolis plant 406, the Milwaukee plant 408 and the Cleveland plant 410 are solutions each corresponding to a "plant" component, but with different connections to back-end data. In one embodiment of the present invention, the component "plant" comprises the members "bottling line," "can line," "human resource," and "maintenance," each such member being a component. Therefore, the Chicago plant 404 has a bottling line 412, a can line 414, a human resource department 416 and a maintenance department 418. The other plants have the same members but may connect to different back-end data. The tree style display and navigation structure is preferred because it is visually intuitive. A tree branch may comprise sub-branches, as a component may comprise member components. However, solutions may also be displayed using other presentation and navigation structures. Programming controls, such as the Visual Basic Tree View control, are known to those of ordinary skill, and can be used to generate navigable displays representing hierarchical relationships between objects by a visual arrangement of labels and/or icons associated with represented objects. See, for example, Microsoft Visual Basic—Professional Features, Microsoft Corp., 1995.

At run time, a solution represents an instance of a corresponding component. A developer or user can define and modify the run-time attributes of a solution component instance, such as name, description, and connection characteristics. Such connection characteristics may include what data sources to connect to, when to connect, the program code or system command to connect to a data source and retrieve data, and how frequently to retrieve data. When one or more components that make up a solution have been changed, i.e., when members are added to, modified, or deleted from a component, or the name or icon of the component has been changed, a developer or user may update the solution through a menu option. This action updates the solution to include the latest changes to the components.

A node "global collections" and a sub-node "customers" are displayed at the bottom of the solution tree in FIG. 3. The global collection section will be described in connection with FIG. 7.

Figure 4:
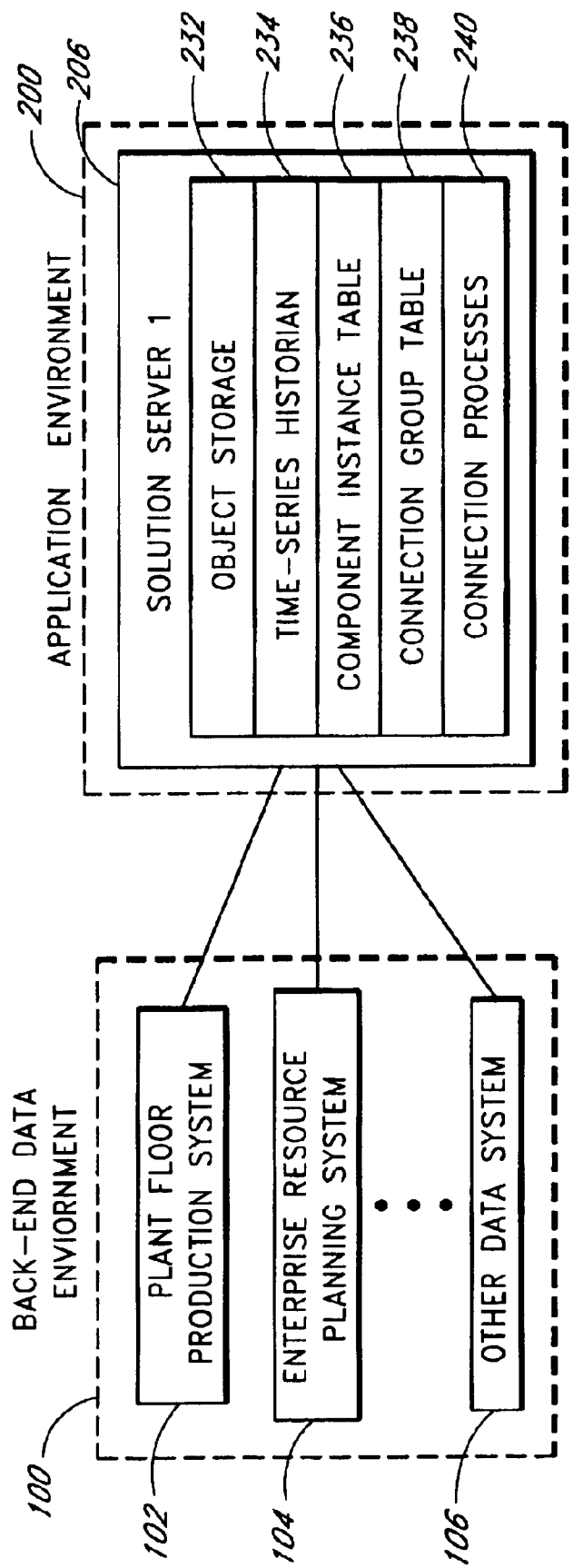
FIG. 4 illustrates an embodiment of the data communication between the application environment and the back-end data environment.

FIG. 4 illustrates the back-end data environment 100 connected to the application environment 200, through solution server 206. While multiple solution servers may be connected to the back-end data environment 100, only one solution server 206 is shown for ease of illustration. The connection processes module 240 retrieves data from the back-end data environment 100 and sends the retrieved data to the object storage 232. If specified in the solution builder 248 to be stored in the time-series historian 234, then the retrieved data is also stored in the time-series historian 234.

The object storage 232 receives and stores relational data and point data. Point data is retrieved by the connection processes module 240 from the back-end data environment 100 to the object storage 232, when a view corresponding to said point data is displaying on a browsing terminal 302. This run-time retrieval of point data retrieves only the set or subset of point data that is requested by the displaying view, and only when requested.

Relational data and other collection data are retrieved by the connection processes module 240 from the back-end data environment 100 to the object storage 232, when a solution connects said relational data to the solution using a connection group. A solution can also connect to back-end data by selecting a subset of a global collection that connects to back-end data. In one embodiment a process connected to the relational data source in the back-end data environment 100 automatically detects changes and sends changes to the back-end data as change records to the object storage 232 and the recorded changes are applied to the data in the object storage 232. This method of applying changes reduces the quantity of data needed to be retrieved from the back-end data environment 100. In another embodiment the back-end data environment 100 does not create change records, and data from the back-end data environment are transmitted to the object storage 232 according to the data retrieval frequency specified in the connection group.

Figure 5:
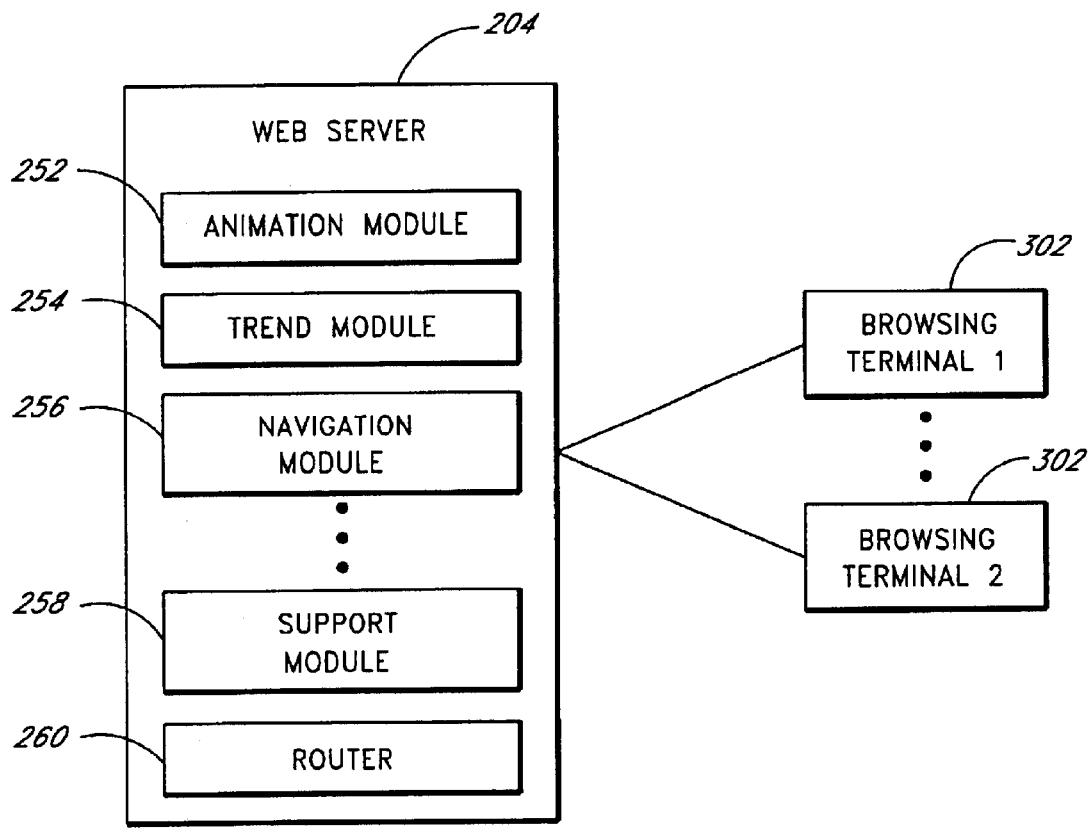
FIG. 5 illustrates an embodiment of the data communication between the application environment and the browsing environment.

FIG. 5 illustrates the browsing terminals 302 and the web server 204. The browsing terminals 302 connect to the web server 204 through a computer network by launching a web browser such as Microsoft's Internet Explorer or Netscape's Netscape Communicator. The applet or applets comprising the modules 252, 254, 256 & 258 are downloaded from the web server 204 to the browsing terminals 302. Using the downloaded applet(s), the browsing terminals 302 display the views defined in the enterprise server 202 representing component instances in solution servers 206. From the browsing terminals 302, users can select one or more existing views for display, but cannot update components, views or solutions. If users are given access, they can create and edit components, views and solutions from the development clients 210.

The router 260 is the data communication gateway between the browsing terminals 302 and the application environment 200. The router 260 retrieves view definitions and component definitions from the component table 222 in the enterprise server 202. Data and component instances requested by the browsing terminals 302 are transmitted from the solution servers 206 through the router 260 to the browsing terminals 302.

A user/developer can use the animation module 252 to pick a data display field within a view, and select a "show trend" option to display the change of data over time for the component member represented by that data display field. The trend module 254 then provides a graphic representation of data change over time for the component member. Historical data is retrieved from the time-series historian 234 or the back-end time-series historian.

Figure 6:
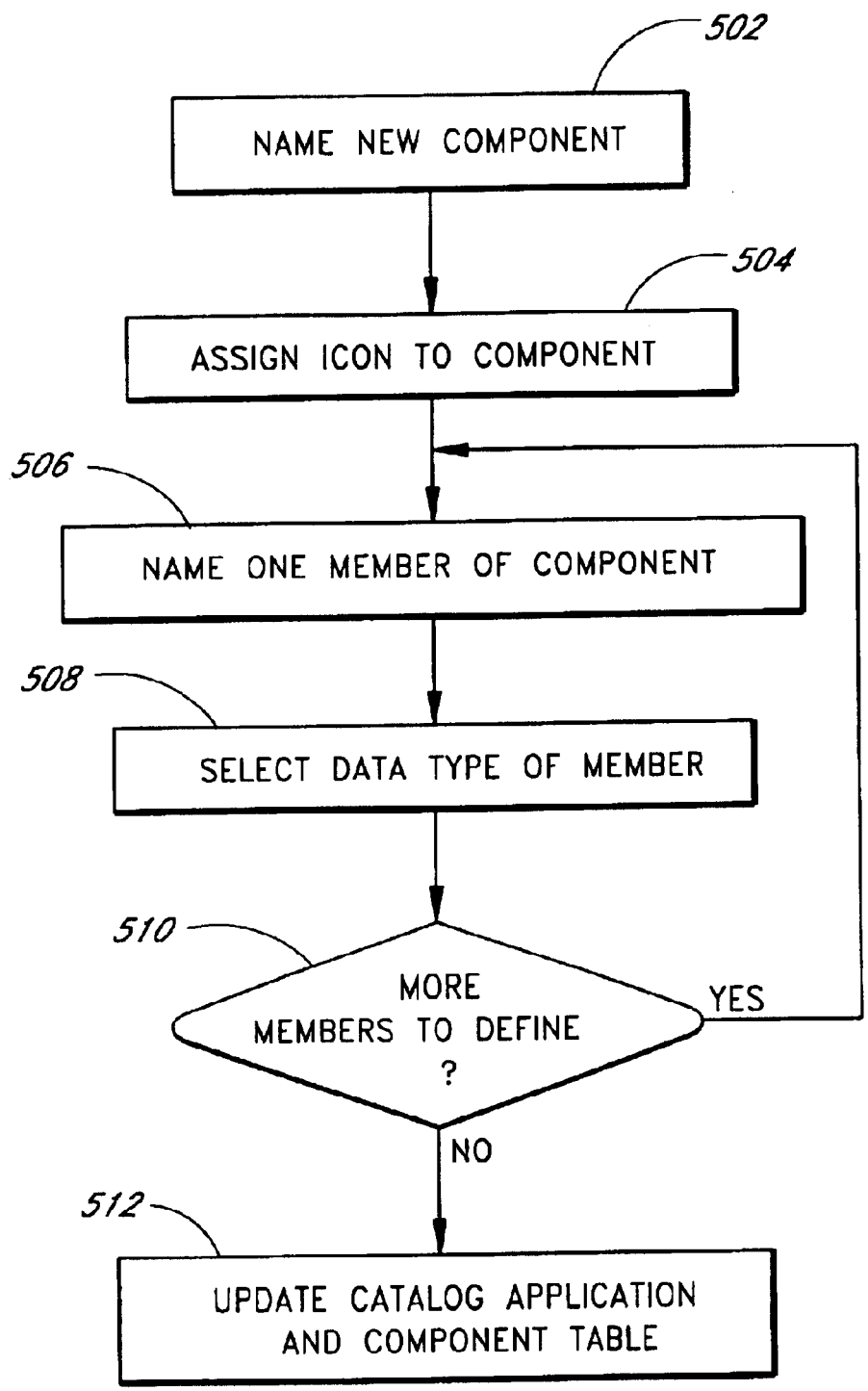
FIG. 6 is a flowchart illustrating a process of creating a component.

FIG. 6 is a flowchart illustrating a process of creating a component. When a user or developer selects the menu option "create new component" in the catalog application 242, he/she is then directed to the component builder 244 and prompted to enter a name for the new component in step 502. The new component name must be different from existing component names. In one embodiment the user/developer is also prompted to enter a text description for the new component. The user/developer is then prompted to assign a graphic icon to the new component in step 504. The user/developer is presented a list of icons or allowed to search for icon files. In the preferred embodiment the user/developer is prompted to assign two icons to a new component, including one small icon and one large icon for various display of the component. The user/developer is then prompted to define members of the component. The user/developer is prompted to define the name of the member in step 506, and to select the data type of the member in step 508. The data type can be a primitive type such as integer, decimal number, Boolean logical value, text string or date, or an existing component. The user/developer continues adding members to the component, until he/she indicates to step 510 that all members have been added. In the preferred embodiment the user/developer makes this indication by select a "save component definition" menu option. In step 512 the client development client 210 updates the catalog application 242 to include the name and icon of the new component. In step 512 the client development client 210 also sends the new component definition to the component table 222 in the enterprise server 202. In another embodiment, the user or developer starts the process of creating a component in the component builder 244.

Figure 7:
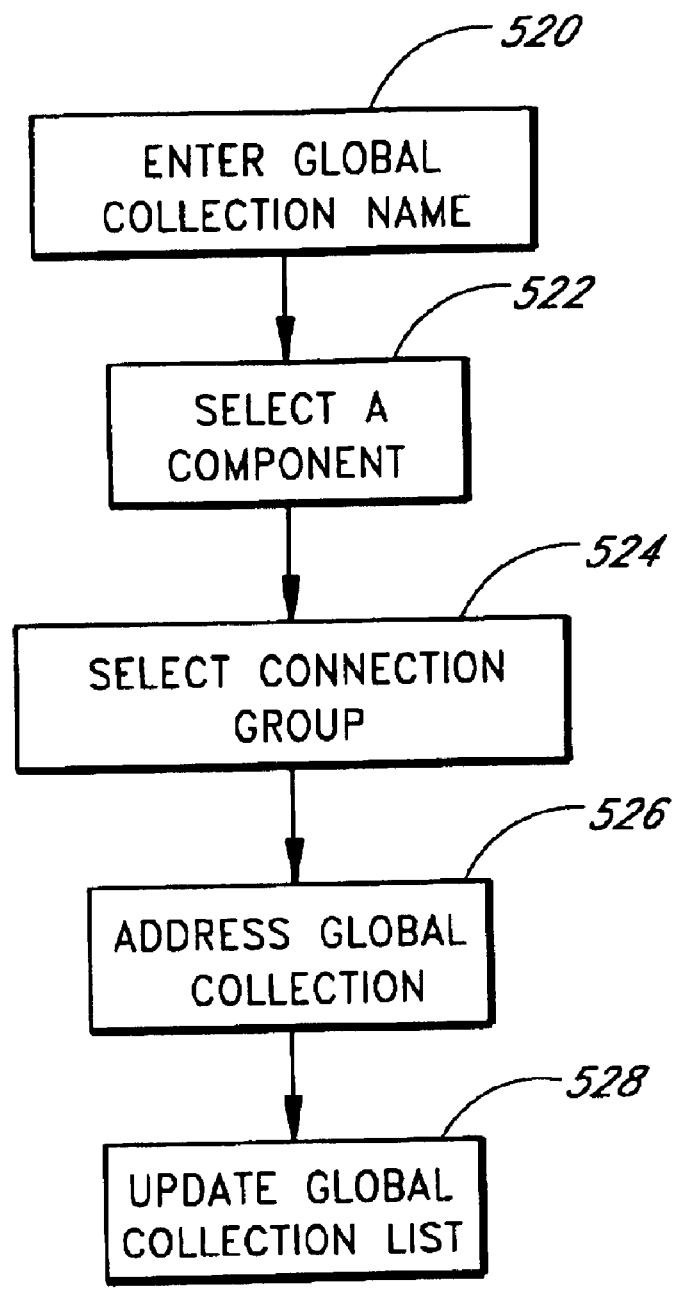
FIG. 7 is a flowchart illustrating a process of creating a global collection.

FIG. 7 is a flowchart illustrating the process of creating a global collection. A global collection represents multiple instances of the same class of data, such as "all orders", "all customers", or "all customers from the East Regional Database". A component member designated a collection member is connected to back-end data through "filtering" a global collection, i.e., selecting a subset of a global collection. A component member representing more than a single value is preferably designated a collection member. A member not designated a collection member connects to back-end data through a connection group, as described above. For example, a component member "customers" of a "sales organization" component may contain a collection of more than one customer. Once a global collection is created, a component member can be connected to back-end data as all or a subset of the global collection. For example, once a global collection of "all customers" is created and its connection to back-end data defined, a component of "active customers" can be connected to back-end data as a subset of the global collection. Components of "inactive customers" or "preferred customers" can also be connected as a subset of the global collection. Relational data members with multiple values are preferably designated collection members. Members representing programmatic data, i.e, data structures returned from API(Application Programming Interface) calls, can also be designated collection members. In the Specification the term relational data comprises data structures returned from API calls.

In step 520, a user or developer selects a menu option of "create global collection" in the solution builder 248, and enters a name for the global collection. The user/developer is then prompted in step 522 to select a component from a list of existing components to correspond to the new global collection. This defines the type of data that is associated with and managed by the global collection. The user/developer is then prompted in step 524 to select a connection group from a list of existing connection groups to connect the global connection to back-end data. For example, one "Oracle" connection group connects to back-end Oracle database, one "MS-SQL" connection group connects to Microsoft SQL database.

In step 526 the user/developer addresses the new global collection. Addressing a global collection provides information needed to acquire the desired collection data from the back-end environment 100. The user/developer enters program commands and configurations to associate the members of the selected component with back-end data items. In one embodiment the user/developer addresses the new global collection by entering a query statement specifying the back-end data items to select data from, and maps the specified data-end data items to the members of the selected component. In step 528 the solution builder 248 updates the global collection list. In the preferred embodiment the updated global collection list is displayed at the bottom of the solution tree.

Figure 8:
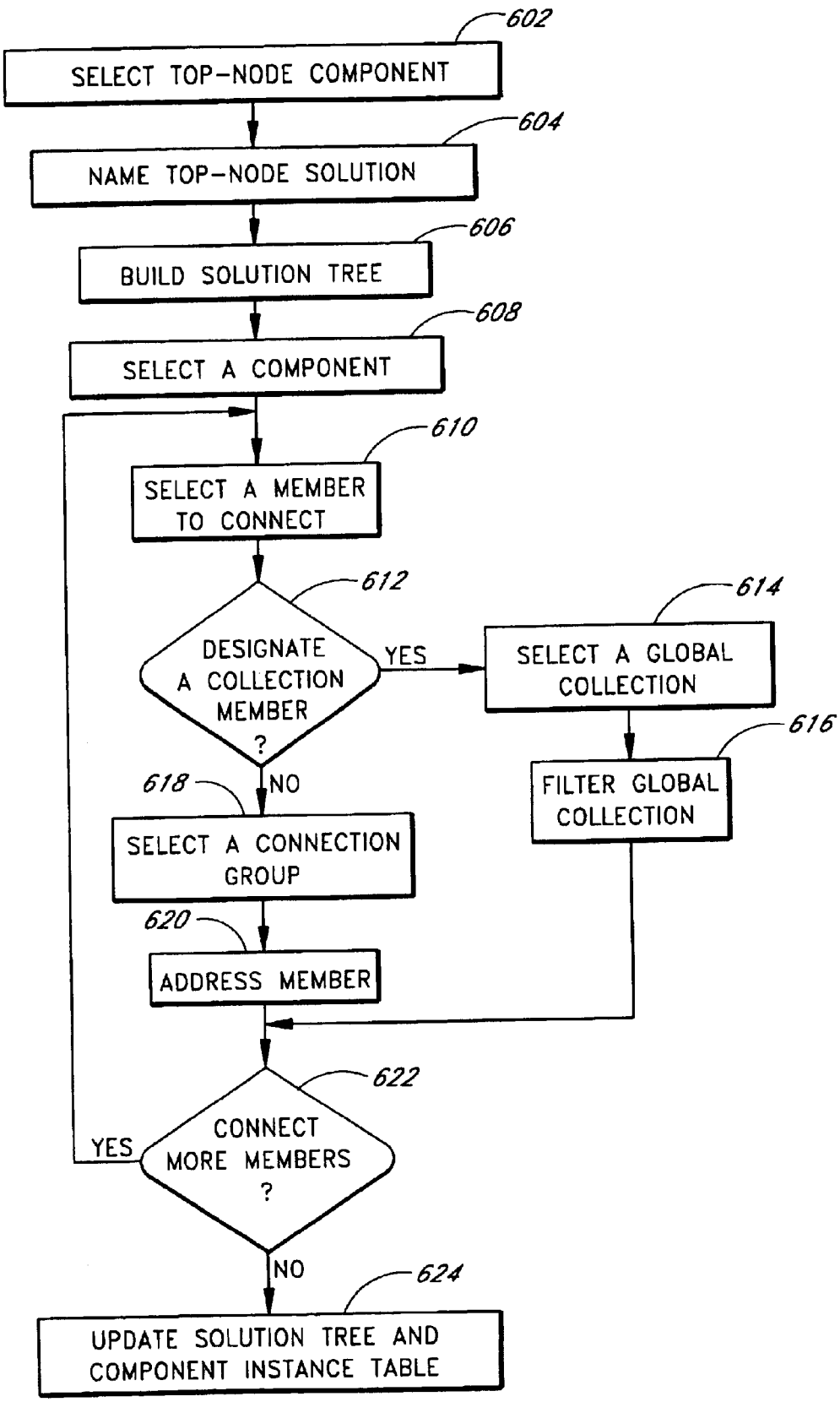
FIG. 8 is a flowchart illustrating a process of creating a solution.

Connecting a component as a subset of an already defined global collection typically requires less technical skill than connecting a component directly to back-end data. Therefore, the method of creating a global collection first, then connecting components as a subset of the created global collection eases the technical burden on users and developers. Once the global collection is defined correctly, users or developers who connect components as a subset of the global collection will not connect the components to the wrong back-end data sources. The word "subset" used in the specification and the claims comprises "a part of" and "all of". FIG. 8 is a flowchart illustrating a process of creating a solution. A top-node component must first be identified to build a hierarchical object model for display, navigation and data collection. A tree-style display is one form of display of the hierarchical object model. The user or developer selects a component as the top-level component in step 602 in the solution builder 248. The developer is then prompted in step 604 to enter a top-node solution name and description. In step 606 the solution builder 248 then displays a solution tree with the selected component at the top node, its members as branches of the tree, and sub-members as sub-branches. In one embodiment only component members are shown as branches of the tree.

In one embodiment steps 602 through 606 are preformed using a system administration module. When an object model has been created and displayed as a solution tree, a user or developer proceeds from step 608 within the solution builder 248. In step 608 a user or developer selects a component represented by a node on the solution tree, and selects the "create solution" option to connect back-end data to an instance of the selected component. The user/developer is prompted in step 610 to select a member of the selected component for connecting to back-end data. In step 612 the user/developer determines whether to designate the selected member as a collection data member. Members representing multiple value data are preferably designated as collection data members.

If the selected member is designated a collection data member, then the user/developer is prompted in step 614 to select a global collection from a list of existing global collections. The user/developer is then prompted in step 616 to filter the selected global collection, by selecting a subset of said global collection. For example, for a component member "active customers", the user/developer selects a global collection "all customers", and in one embodiment selects a subset of the global collection by entering program code "select from all-customers where customer-status =active". If the selected member is not designated a collection data member then the user/developer connects the member to back-end data by selecting a connection group from a list of existing connection groups in step 618, and then addressing the member in step 620. The user/developer addresses the selected member in step 620 by specifying the back-end data item that the member corresponds to.

In step 622, if the user/developer indicates he/she has completed connecting members to back-end data, then the solution builder 248 proceeds to step 624. Otherwise the solution builder 248 returns to step 610 to select another member for connection. In step 624 the solution builder 248 transmits the solution definition to enterprise server 202 and solution server 206. The connection specification for each component member of the solution is stored in the component instance table 236, and the name and description of the solution are stored in the solution table 226.

As indicated above, a developer or user may specify a solution's connection to back-end data through connection groups, each comprising a connection process. Each connection process comprises the program command to execute a connector. Connectors can be independent third party packages or custom programmed for the claimed system. One an embodiment uses a connector toolkit developed by the applicant that allows developers to build connectors in Java and optionally, in C or C++. A developer or user can create different connection groups that use the same connector. For example, one connection group connects to production data for last year; another connection group connects to production data for the current month, contained in the same back-end data source. One connection group may scan for data at a frequency of every second, while another connection group may scan for data, using the same connector, at a frequency of every minute. The claimed system allows a user or developer to specify the data scanning frequency. A connection group acquires back-end data using a connection process, which comprises the program command for running a connector.

The solution builder 248 allows a user or developer to add, modify or delete a connection process. To add a connection process, the user/developer selects the option "add a connection process", and is prompted to enter a name and description for the new connection process. The user/developer is then prompted to enter a program command for the connection process. A developer typically performs the task of entering a program command.

The solution builder 248 also allows a user or developer to add, modify or delete a connection group. To add a connection group, the user/developer selects the option "add a connection group", and is prompted to enter a name and description for the new connection group. The user/developer is then prompted to select a connection process from a list of connection processes and a connector type from a list of connector types. A connector type is the type of a connector defined in the connector builder 250. The selected connection process is the connection process that corresponds to the new connection group. In one embodiment, the user/developer is then allowed to specify the data scanning frequency of the connection group.

Figure 9:
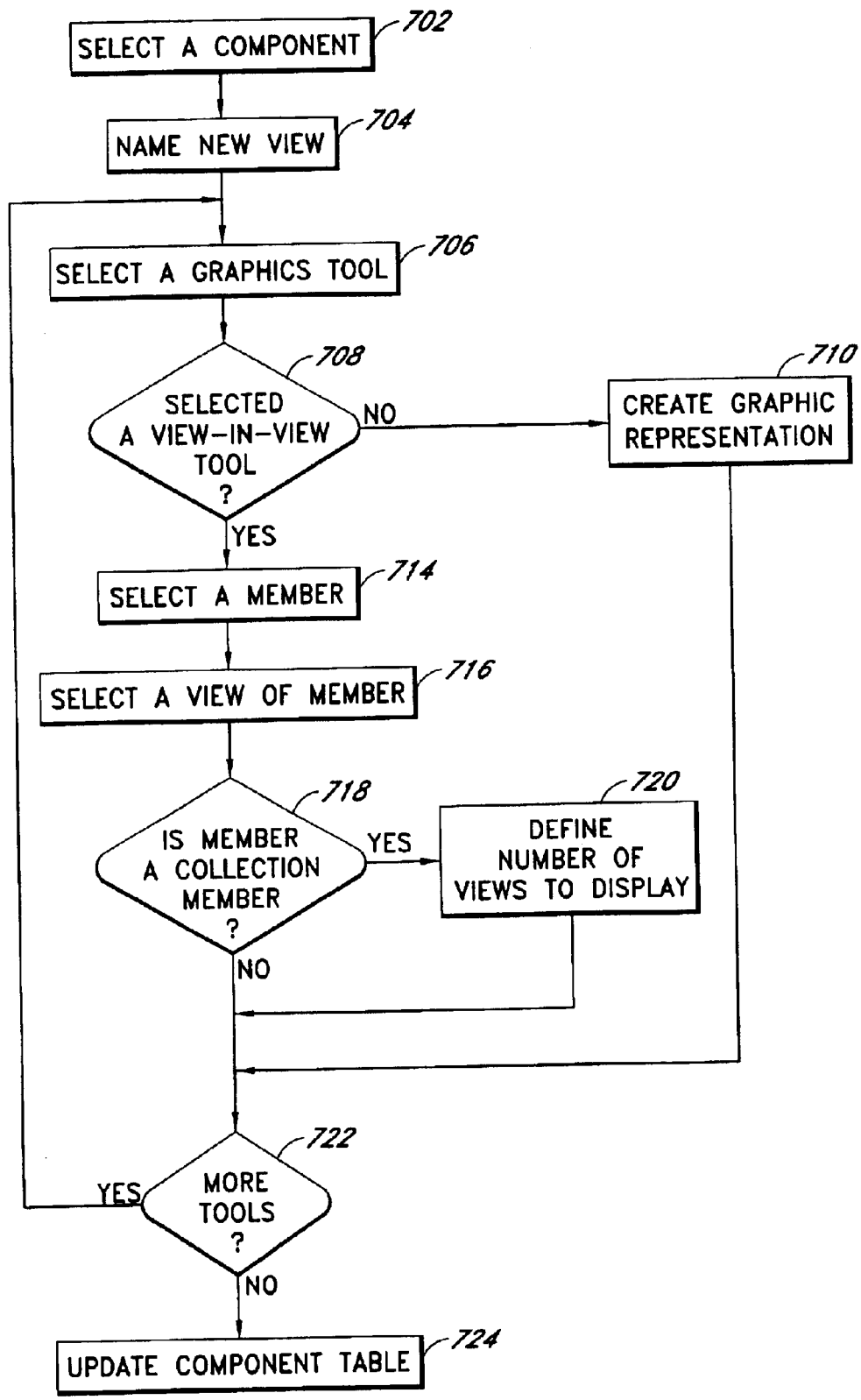
FIG. 9 is a flowchart illustrating a process of creating a view.

FIG. 9 is a flowchart illustrating a process of creating a view. In step 702, a developer or user selects a component from the catalog application 242, and selects the menu option "create new view" to create a new view corresponding to the selected component. The user/developer is then directed to the view builder 246 and prompted to enter a name for that view, in step 704. In one embodiment the user/developer is also prompted to enter a description for that view in step 704.

In step 706 the user/developer is prompted to select a graphic tool. Graphic representations are created using graphic tools, which comprise of tools for drawing tables, charts, lines, animations, etc. The view builder 246 has a set of drawing tools for presenting titles, charts, tables, backgrounds graphics, and other graphical elements. The view builder 246 also allows a developer or user to create and edit animations. Animation changes characteristics such as fill color and size based on fluctuations in back-end data. Animations contain references to component members that are linked through a solution to collect data from back-end data sources. The view builder 246 also allows the creation and editing of views as web hyperlinks to URLs (Uniform Resource Locator). In one embodiment, the user or developer starts the process of creating a view from the view builder 246.

If the user/developer selects a view-in-view tool, i.e. a tool for inserting a view inside a view, then step 708 proceeds to step 714. If the selected tool is not a tool for inserting a view inside a view, then step 708 proceeds to step 710. A view-in-view tool allows a user/developer to insert, within a view representing a component, a sub-view representing a component member of that component at a location determined by the user/developer.

In step 710 the user/developer creates a graphic representation using the selected tool. The graphic representation may comprise an animation. The graphic representation also may comprise program commands for associating data values with the graphic effects. For example, a user/developer can use the selected graphic tool to represent a "pump temperature" field as a blue rectangle, and enter a program command to fill the rectangle with red color or flashing red color when temperature exceed five hundred degrees. The user/developer then is directed to step 722.

If the user/developer selects a view-in-view tool, then in step 714 the user/developer is prompted to select a member of the selected component. Since a view representing the selected member is to be inserted to the newly created view representing the selected component, the selected member is a component itself. In one embodiment the user/developer is prompted to select from a list of component members of the selected component. The user/developer is prompted to select a view from the existing views of the member component, in step 716. The user/developer uses the view-in-view tool to place the selected member view inside the newly created component view.

The view builder 246 then determines in step 718 if the selected member is designated as a collection member. If the selected member is a collection member, then the user/developer is prompted in step 720 to determine the number of views to be displayed for the collection member. In one embodiment the user/developer is prompted to enter the number of rows and columns to be displayed for the collection member.

In step 722 the user/developer indicates whether to select more tools to prepare more graphic representation of the selected component. If the user/developer indicates yes, he/she is returned to step 706. If the indication is no, he/she is directed to step 724. In step 724, the view builder 246 transmits the created view definition to enterprise server 202 to be stored in the component table 222.

In one embodiment, a default view is defined for each component that has one or more views associated with the component. When a component has no corresponding views, the first view created for that component is defined as the default view. When a component has one or more corresponding views, a user/developer can define the default view by selecting the component in the catalog application 242 and entering a "update component—update default view" option. This embodiment can be achieved by having a "default view? Yes or No" logical field within the view definition, or by having a "default view" field within the component definition containing the name of the default view. When a view representing a component having a component member is displayed, the sub-view representing the component member is also displayed. When a user/developer selects the sub-view, preferably by highlighting or double-clicking with a mouse, the default view representing the component member is displayed. For example, within a view representing a plant operation is displayed a view representing a motor. When the view representing the motor is selected, the default view representing the motor is displayed, which is typically a detailed view of the motor. A user/developer is thus allowed to "drill down" to further details. A user/developer can also select another view of the component member, preferably by right-clicking on the sub-view to bring up a list of views corresponding to the component member and selecting one of the views from the list.

At run time, data is retrieved through connections defined in a solution, and displayed using a view associated with the component that is associated with the solution.

The provisional application on which this application is based, including its attached "Indx HQ User's Guide", is hereby incorporated into the specification.

Although the foregoing has been a description and illustration of specific embodiments of the invention, various modifications and changes can be made thereto by persons skilled in the art, without departing from the scope and spirit of the invention as defined by the following claims.

What is claimed is:

1. A method of generating a model for the collection and display of data from multiple sources, the method comprising:
   generating a first component that represents a first type of business element that exists within a business entity, said first component being a reusable software component for collecting data associated with business elements of the first type;
   defining a first view that specifies how data collected by the first component is to be displayed;
   creating multiple instances of the first component, each of which corresponds to a different respective business element of said first type;
   connecting each instance of the first component to a respective set of back-end data sources associated with the respective business element, to allow the instances of the first component to collect data associated with their respective business elements, wherein the step of connecting each instance of the first component to a respective set of back-end data sources comprises separately specifying for each instance a frequency with which to poll a back-end data source for new data; and
   providing a navigation interface through which a user may navigate the multiple instances of the first component to view collected data associated with each of the multiple business elements of the first type, wherein the navigation interface displays said data according to at least said first view;
   whereby the first component and the first view are reused to collect and display data associated with the multiple different business elements of the first type.

2. The method of claim 1, further comprising defining a second view that specifies how data collected by the first component is to be displayed, wherein the navigation interface provides an option for users to select between at least the first and second views to view data collected by an instance of the first component.

3. The method of claim 1, wherein the first component is configured to collect data describing a status of at least one element of machinery within a manufacturing facility.

4. The method of claim 1, wherein the first component is configured to collect real-time data from back-end data sources.

5. The method of claim 4, wherein the first component is further configured to collect non-real-time data from at least one back-end database.

6. The method of claim 1, wherein the first component represents a business unit that is replicated within the business entity.

7. The method of claim 6, wherein the first component is configured to collect data from a disparate set of back-end data sources that are associated with each such replicated business unit.

8. The method of claim 6, wherein the first component comprises a second component that represents a business sub-unit that exists within each replicated business unit, said second component being associated with a second view that specifies how data associated with the business sub-unit is displayed.

9. The method of claim 8, wherein the navigation interface represents each such business sub-unit within a navigation node structure as a child of the respective business unit to which that sub-unit corresponds.

10. The method of claim 1, wherein the first component comprises multiple members, and wherein the step of connecting the multiple instances of the first component to respective sets of back-end data sources comprises connecting each member of each instance of the first component to a different respective back-end data source.

11. The method of claim 1, wherein defining the first view comprises defining an animation, said animation providing an image that changes in appearance in response to fluctuations in data collected from a back-end data source.

12. The method of claim 1, wherein defining the first view comprises including within the first view a hyperlink to a second view that corresponds to a second component.

13. The method of claim 1, further comprising generating a second component that represents a second type of business element that exists within the business entity, wherein the second component contains the first component, and wherein the navigation interface permits a user to drill down from an instance of the second component to a corresponding instance of the first component to view data collected by the first component.

14. A model generated according to the method of claim 1 represented within computer memory.

15. A model development system that is configured to perform the method of claim 1 under the control of a user to generate a model.

16. A system for the collection and display of data from multiple sources, the system comprising, within computer memory:
   a plurality of instances of a first component, said first component representing a first type of business element that exists within a business entity, each instance of the first component representing, and being configured to collect data associated with, a respective one of said business elements;
   a plurality of views that each correspond to the first component, each such view specifying how data collected by the first component is to be displayed; and
   a navigation interface that provides functionality for users to navigate the plurality of instances of the first component, wherein the navigation interface provides a user option to select between the plurality of views to view the data collected by each of the plurality of instances of the first component;
   wherein the first component includes a second component that represents a second type of business element that is a member of the first type of business element, wherein each instance of the first component includes a respective instance of the second component, and wherein the navigation interface represents each instance of the second component as a child node of a parent node that represents the corresponding instance of the first component.

17. The system of claim 16, wherein the first component is configured to collect real-time data from back-end systems of the first type of business element.

18. The system of claim 17, wherein the first component is further configured to collect non-real-time data from a back-end database of the first type of business element.

19. The system of claim 16, wherein each instance of the first component is connected to a different respective set of back-end data sources.

20. The system of claim 19, wherein the back-end data sources include units of machinery within a manufacturing facility.

21. The system of claim 16, wherein the navigation interface displays a listing of the plurality of views in response to a user clicking on a node representing an instance of the first component, such that the user may select a view from said listing for viewing associated data.

22. The system of claim 16, further comprising a second view that specifies how data collected by the second component is to be displayed, said second view being different from each of the plurality of views corresponding to the first component.

23. The system of claim 16, wherein at least one of the views includes an animation that displays an image that changes in appearance in response to fluctuations in data from a back-end data source.

24. The system of claim 16, wherein the first component includes a plurality of members, each of which is configured to connect to a different respective type of back-end data source.

25. The system of claim 16, wherein the navigation interface supports navigation of the plurality of instances of the first component via a web browser.

26. A development system for developing a model for the collection and display of data, the development system comprising:

a component builder that provides functionality for generating reusable components for collecting data from back-end data sources, including back-end data sources associated with business elements, whereby a user may create a reusable component that represents a particular type of business element, wherein the component builder provides functionality for generating a component that includes one or more other components generated by the component builder, whereby sub-units of an element are modeled as sub-components of the component representing that element;

a view builder that provides functionality for generating views that correspond to specific components generated by the component builder, whereby a user can generate one or more views that specify how data collected by a corresponding component is to be displayed, wherein the view builder provides functionality for inserting a view corresponding to a first component within a view corresponding to a parent component of the first component;

a catalog that contains components generated with the component builder; and a module that provides functionality for selecting components from the catalog, creating multiple instances of a selected component to represent multiple elements of a common type, and connecting an instance to a respective source of back-end data to allow that instance to collect data.

27. The development system of claim 26, further comprising a navigation interface that represents each instance of each selected component as a respective node of a hierarchical node structure that may be browsed by users to view collected data.

28. The development system of claim 26, wherein the view builder enables a user to generate a first view that includes a hyperlink to a second view.

29. The development system of claim 26, wherein the view builder enables a user to define multiple views for a given component, and wherein the system further comprises a navigation interface that allows users to select between said multiple views to view data collected by instances of the given component.

30. The development system of claim 26, wherein the view builder provides functionality for incorporating into a view an animation that changes the appearance of a graphical image in response to fluctuations in back-end data collected by a corresponding component.

31. The development system of claim 26, wherein the module includes a connection tool that provides functionality for connecting a selected instance of a component to a disparate set of back-end data sources.

32. The development system of claim 31, wherein the connection tool supports connections to point sources of real-time data and to back-end databases.

33. The development system of claim 31, wherein the connection tool enables a user to specify a frequency with which data is to be collected from a selected data source.

34. The development system of claim 26, wherein the system supports an ability to make a modification to an existing component with the component builder, and to propagate the modification to multiple existing instances of that component.

35. A development system for developing a model for the collection and display of data, the development system comprising:

a component builder that provides functionality for generating reusable components for collecting data from back-end data sources, including back-end data sources associated with business elements, whereby a user may create a reusable component that represents a particular type of business element;

a view builder that provides functionality for generating views that correspond to specific components generated by the component builder, whereby a user can generate one or more views that specify how data collected by a corresponding component is to be displayed;

a catalog that contains components generated with the component builder; and a module that provides functionality for selecting components from the catalog, creating multiple instances of a selected component to represent multiple elements of a common type, and connecting an instance to a respective source of back-end data to allow that instance to collect data wherein the module includes a connection tool that provides functionality for connecting a selected instance of a component to a disparate set of back-end data sources, and the connection tool enables a user to specify a frequency with which data is to be collected from a selected data source.

36. The development system of claim 35, wherein the component builder provides functionality for generating a component that includes one or more other components generated by the component builder, whereby sub-units of an element are modeled as sub-components of the component representing that element.

37. The development system of claim 35, further comprising a navigation interface that represents each instance of each selected component as a respective node of a hierarchical node structure that may be browsed by users to view collected data.

38. The development system of claim 35, wherein the view builder provides functionality for inserting a view corresponding to a first component within a view corresponding to a parent component of the first component.

39. The development system of claim 35, wherein the view builder enables a user to generate a first view that includes a hyperlink to a second view.

40. The development system of claim 35, wherein the view builder enables a user to define multiple views for a given component, and wherein the system further comprises a navigation interface that allows users to select between said multiple views to view data collected by instances of the given component.

41. The development system of claim 35, wherein the view builder provides functionality for incorporating into a view an animation that changes the appearance of a graphical image in response to fluctuations in back-end data collected by a corresponding component.

42. The development system of claim 35, wherein the connection tool supports connections to point sources of real-time data and to back-end databases.

43. The development system of claim 35, wherein the system supports an ability to make a modification to an existing component with the component builder, and to propagate the modification to multiple existing instances of that component.

44. A method of generating a model for the collection and display of data from multiple sources, the method comprising:

generating a first component that represents a first type of business element that exists within a business entity, said first component being a reusable software component for collecting data associated with business elements of the first type, wherein the first component represents a business unit that is replicated within the business entity, and comprises a second component that represents a business sub-unit that exists within each replicated business unit, said second component being associated with a second view that specifies how data associated with the business sub-unit is displayed;

defining a first view that specifies how data collected by the first component is to be displayed;

creating multiple instances of the first component, each of which corresponds to a different respective business element of said first type;

connecting each instance of the first component to a respective set of back-end data sources associated with the respective business element, to allow the instances of the first component to collect data associated with their respective business elements; and providing a navigation interface through which a user may navigate the multiple instances of the first component to view collected data associated with each of the multiple business elements of the first type, wherein the navigation interface displays said data according to at least said first view;

whereby the first component and the first view are reused to collect and display data associated with the multiple different business elements of the first type.

45. The method of claim 44, further comprising defining a third view that specifies how data collected by the first component is to be displayed, wherein the navigation interface provides an option for users to select between at least the first and third views to view data collected by an instance of the first component.

46. The method of claim 44, wherein the first component is configured to collect data describing a status of at least one element of machinery within a manufacturing facility.

47. The method of claim 44, wherein the first component is configured to collect real-time data from back-end data sources.

48. The method of claim 47, wherein the first component is further configured to collect non-real-time data from at least one back-end database.

49. The method of claim 44, wherein the first component is configured to collect data from a disparate set of back-end data sources that are associated with each such replicated business unit.

50. The method of claim 44, wherein the navigation interface represents each such business sub-unit within a navigation node structure as a child of the respective business unit to which that sub-unit corresponds.

51. The method of claim 44, wherein the first component comprises multiple members, and wherein the step of connecting the multiple instances of the first component to respective sets of back-end data sources comprises connecting each member of each instance of the first component to a different respective back-end data source.

52. The method of claim 44, wherein defining the first view comprises defining an animation, said animation providing an image that changes in appearance in response to fluctuations in data collected from a back-end data source.

53. The method of claim 44, wherein defining the first view comprises including within the first view a hyperlink to a second view that corresponds to a second component.

54. The method of claim 44, further comprising generating a third component that represents a third type of business element that exists within the business entity, wherein the third component contains the first component, and wherein the navigation interface permits a user to drill down from an instance of the third component to a corresponding instance of the first component to view data collected by the first component.

55. A model generated according to the method of claim 44 represented within a computer memory.

56. A model development system that is configured to perform the method of claim 44 under the control of a user to generate a model.

57. A method of generating a model for the collection and display of data from multiple sources, the method comprising:

generating a first component that represents a first type of business element that exists within a business entity, said first component being a reusable software component for collecting data associated with business elements of the first type;

defining a first view that specifies how data collected by the first component is to be displayed;

creating multiple instances of the first component, each of which corresponds to a different respective business element of said first type;

connecting each instance of the first component to a respective set of back-end data sources associated with the respective business element, to allow the instances of the first component to collect data associated with their respective business elements; and providing a navigation interface through which a user may navigate the multiple instances of the first component to view collected data associated with each of the multiple business elements of the first type, wherein the navigation interface displays said data according to at least said first view;

whereby the first component and the first view are reused to collect and display data associated with the multiple different business elements of the first type;

and wherein the method further comprises generating a second component that represents a second type of business element that exists within the business entity, wherein the second component contains the first component, and wherein the navigation interface permits a user to drill down from an instance of the second component to a corresponding instance of the first component to view data collected by the first component.

58. The method of claim 57, further comprising defining a second view that specifies how data collected by the first component is to be displayed, wherein the navigation interface provides an option for users to select between at least the first and second views to view data collected by an instance of the first component.

59. The method of claim 57, wherein the first component is configured to collect data describing a status of at least one element of machinery within a manufacturing facility.

60. The method of claim 57, wherein the first component is configured to collect real-time data from back-end data sources.

61. The method of claim 60, wherein the first component is further configured to collect non-real-time data from at least one back-end database.

62. The method of claim 57, wherein the first component represents a business unit that is replicated within the business entity.

63. The method of claim 62, wherein the first component is configured to collect data from a disparate set of back-end data sources that are associated with each such replicated business unit.

64. The method of claim 57, wherein the first component comprises multiple members, and wherein the step of connecting the multiple instances of the first component to respective sets of back-end data sources comprises connecting each member of each instance of the first component to a different respective back-end data source.

65. The method of claim 57, wherein defining the first view comprises defining an animation, said animation providing an image that changes in appearance in response to fluctuations in data collected from a back-end data source.

66. The method of claim 57, wherein defining the first view comprises including within the first view a hyperlink to a second view that corresponds to a third component.

67. A model generated according to the method of claim 57 represented within computer memory.

68. A model development system that is configured to perform the method of claim 57 under the control of a user to generate a model.

\* \* \* \* \*